United States Patent [19]

Foster

[11] 4,054,820
[45] Oct. 18, 1977

[54] SERVO SYSTEM

[75] Inventor: Alan Foster, Hitchin, England

[73] Assignee: International Computers Limited, Stevenage, England

[21] Appl. No.: 600,583

[22] Filed: July 31, 1975

[30] Foreign Application Priority Data

May 17, 1975 United Kingdom .............. 21096/75

[51] Int. Cl.² .......................................... H02P 5/16
[52] U.S. Cl. ................................... 318/341; 318/636; 318/345 E
[58] Field of Search .............. 318/341, 636, 599, 318, 318/314, 345 E

[56] References Cited

U.S. PATENT DOCUMENTS

| | | | |
|---|---|---|---|
| 3,559,018 | 1/1971 | Fournier | 318/341 X |
| 3,659,169 | 4/1972 | Waddicor | 318/341 |
| 3,737,751 | 6/1973 | Lima | 318/341 X |
| 3,838,325 | 9/1974 | Kobayashi | 318/341 |
| 3,950,682 | 4/1976 | Dohanich | 318/341 |

Primary Examiner—B. Dobeck
Attorney, Agent, or Firm—Misegades, Douglas & Levy

[57] ABSTRACT

A closed-loop servo system in which the parameter to be controlled is caused to follow a predetermined profile by approaching the profile, if there is an error, at a rate independent of the magnitude of the error. The system repeatedly tests for an error and adjusts a control input by a predetermined step each time one is found. In a preferred implementation the velocity of a d.c. motor is controlled by means of an up/down counter the value of which controls the motor current.

4 Claims, 3 Drawing Figures

SERVO SYSTEM

BACKGROUND OF THE INVENTION

This invention relates to closed-loop control methods and apparatus.

In a closed-loop control system an element is controlled by applying corrective action if a parameter of the element departs from a desired value. Two broad approaches have been used in such systems.

The first uses analogue techniques and adjusts a control input by an amount depending on the magnitude of the error. A disadvantage of such systems is that they tend to be complex, especially if the response of the system is to be tailored, for example by, introducing lag functions or the like to prevent instability.

In the opposite approach the control input has only two values (typically "on" and "off") and control is exercised by switching from one state to the other. Although such systems are relatively simple they tend to be less precise than analogue systems, are prone to overshoot, and are subject to stresses when the control input changes state.

SUMMARY OF THE INVENTION

The method according to the invention controls an element a parameter of which is responsive to an input. The method causes the parameter to follow a predetermined profile by approaching the profile, if the parameter has departed from it, at a rate independent of the magnitude of the departure. The actual value of the parameter is repeatedly compared with the nominal value it would have if it lay on the predetermined profile, and response to each of these comparisons, depending on its outcome: if the actual value of the parameter is greater than the nominal value, the input is changed by a predetermined step in the sense that reduces the value of the parameter, and if the actual value is less than the nominal value, the input is changed by a predetermined step in the opposite sense.

Thus, the magnitude of the adjustment to the input does not depend on the magnitude of the error; at each stage it is by a predetermined step. If the error is large, several adjustment stages will be needed and the input will increase by steps until the parameter reaches the desired profile. The parameter thus increases at a rate depending on the magnitude of the individual steps, not the total error.

The adjustment steps can be made small enough to avoid the risk of disturbances to the system when they take place, and the final value of the control parameter is then almost continuously variable, giving much more precise control than the on/off method referred to above. The delay while the control parameter reaches its final value has the effect of introducing a lag function, which reduces the possibility of instability.

The method lends itself particularly well to digital implementation.

In the particular embodiment described in detail with reference to the drawings, the element to be controlled is a d.c. motor, the parameter being the motor velocity and the input the motor drive current. But the parameter to be controlled can equally well be other variables, for example, the displacement of an element.

Preferably, on each comparison, there is produced a first indication if the actual value of the parameter exceeds the nominal, or a second indication if the actual value is less than the nominal, and the indications are input to means having a plurality of output states forming an ordered set. Each first indication changes the output state of the means by one in one sense and each second indication changes its output state by one in the opposite sense. The output state of the means then selects a value for the input.

BRIEF DESCRIPTION OF THE DRAWINGS

In order that the invention may be more readily understood a form of apparatus constructed in accordance with the invention and designed to carry out its method will now be described in greater detail by way of example with reference to the accompanying drawings, in which.

Figure 1:
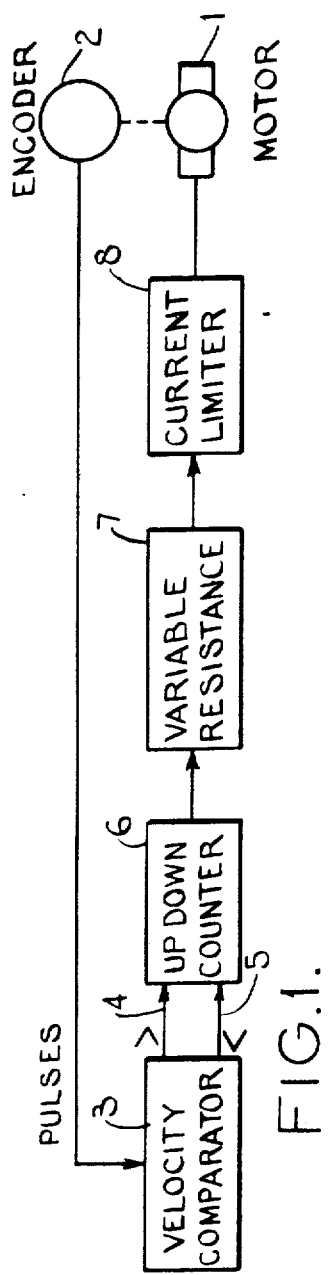
FIG. 1 is a schematic block diagram of the apparatus.

The apparatus is designed to drive the paper feed mechanism of a line-printer for computer output, first at a fixed and constant rate of acceleration, then at a constant velocity, and finally at a fixed and constant rate of retardation. Initially it will be assumed that the paper is being accelerated from rest; elements concerned with the other two phases of the motion will be described afterwards and as they are similar to those shown have been omitted from the drawing for clarity.

Referring to FIG. 1, a permanent magnet d.c. motor 1 of high torque and low inertia supplies drive for the paper feed mechanism. A photo-electric encoder 2 is attached to the shaft of the motor 1 and produces pulses at equal angular increments. The pulses are supplied to a velocity comparator circuit 3, shown in more detail in FIG. 2, which determines the motor position by counting the pulses and the motor velocity by timing the interval between successive pulses. Then, at each pulse, it compares the actual velocity with the appropriate value on a profile of desired velocity against distance.

During the first phase this profile consists of a parabola in which the velocity increases as the square root of the distance; during the second phase it consists of a straight line parallel to the distance axis, and during the third phase it is the reverse of the curve for the first phase. The appropriate values on this profile at the sampling points formed by the encoder pulses — the nominal values — are stored. Then, at each sampling point, the actual value is compared with the nominal value, and if it is too high a pulse is produced on a line 4 as an indication of that fact; if it is too low there is a pulse on a line 5 as an indication of that being the case.

The lines 4 and 5 supply the input to a bidirectional counter 6 counted up by a pulse on the line 4 and down by a pulse on the line 5. The count sets the value of a variable resistance 7, the higher the count the lower the resistance. A voltage is developed across the resistance 7 as a reference for a current-limiting circuit 8 which supplies the motor with a drive current proportional to the reference voltage.

In operation, if the motor velocity during the interval between one encoder pulse and the next is too high, the velocity comparator produces a 'greater than' output on the line 4. The counter 6 is counted up one, the value of the resistance 7 is reduced and the motor drive current falls, reducing the velocity of the motor. There will be a further correction if the velocity is still too high when the next encoder pulse arrives. If the velocity is too low the counter 6 will be counted down and the current increased.

Figure 2:
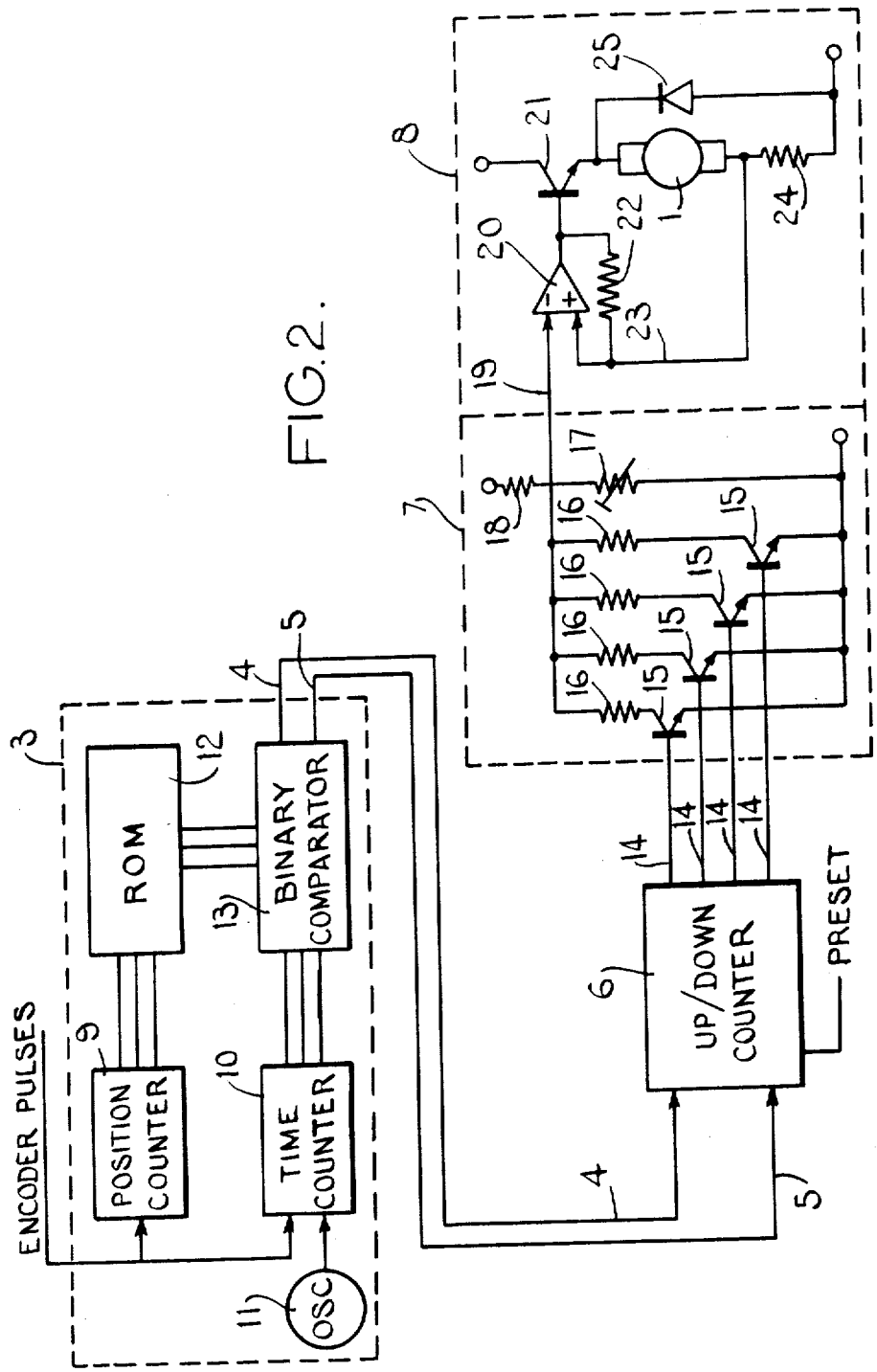
FIG. 2 shows the apparatus in more detail.

Referring to FIG. 2, the control circuit will now be described in more detail. In the velocity comparator 3, the encoder pulses advance in a binary counter 9. Since they occur at fixed angular increments, the value in the counter 9 represents the position of the motor.

Each encoder pulse also resets at zero a binary counter 10 which is advanced by pulses from a fixed frequency oscillator 11. The value of the counter 10 at the instant it is reset thus represents the time between the encoder pulse that resets it and the preceding one, and hence is inversely proportional to the average velocity of the motor since the preceding encoder pulse.

The output of the counter 9 addresses a read-only memory 12. The successive locations of the memory 12 hold the number of oscillator pulses expected between successive encoder pulses; the memory 12 thus contains a representation of the desired velocity profile. Each encoder pulse causes the contents of the appropriate location to be read out and compared in a binary comparator 13 with the count which has been reached in the time counter 10. The output of the comparator 13 is on the lines 4 and 5 already mentioned: if the time count is less than the desired value (so the motor is too fast) there is a pulse on the line 4; if the time count is more (so the motor is too slow) there is a pulse on the line 5. If the time count is correct there is no output.

The outputs on the lines 4 and 5 go to the up/down counter 6, which produces a parallel binary output on lines 14. Each line 14 is connected to the base of a transistor 15 which is switched on by an output on that line. The switched-on transistors 15 allow current to pass through resistors 16 which are in parallel with a presettable resistor 17 and in series with a resistor 18.

The values of the resistances 16 are in a descending binary progression. If the value of the resistance 16 controlled by the least-significant line 14 is R, succeeding resistances are R/2, R/4 and so forth. This means that the total value of the switched on resistances if R/N, where N is the value held in the counter 6. The value R is much greater than the value of the resistor 17, so that the resistances provide an adjustment to a resistance whose magnitude is approximately that of resistance 17.

The voltage developed across the resistors 16 and 17 forms the input to the current-limiting circuit 8. This voltage is applied on a line 19 to one input of a differential amplifier 20, the output of which controls a power transistor 21 in the circuit supplying current to the motor 1. There is a feedback connexion from this output through a resistor 22 to the other input to the differential amplifier, on a line 23. This input is also connected to a current-sensing resistor 24 in the drive circuit to the motor 1. When the voltage on the line 23 exceeds that on the line 19 the amplifier 20 produces a negative output which switches the transistor 21 off.

In operation, when the motor is about to be accelerated from rest, the position counter 9 is set at zero and the up/down counter 6 is preset at a mid-value. As there is initially no motor current to produce an input on the line 23 the differential amplifier 20 will turn on the transistor 21 and motor drive current will start to flow, increasing at a rate (see FIG. 3) which depends on the supply voltage and the motor constants. But before the current reaches its maximum level the voltage on the line 23 becomes equal to that on the line 19, the differential amplifier 20 ceases to produce an output, and the motor supply voltage is cut off. Current will continue to flow, discharging through a diode 25, and will fall to a lower level at which the transistor 21 again turns on. This difference in switching levels results from the hysteresis caused mainly by the feed-back through the resistor 22.

Figure 3:
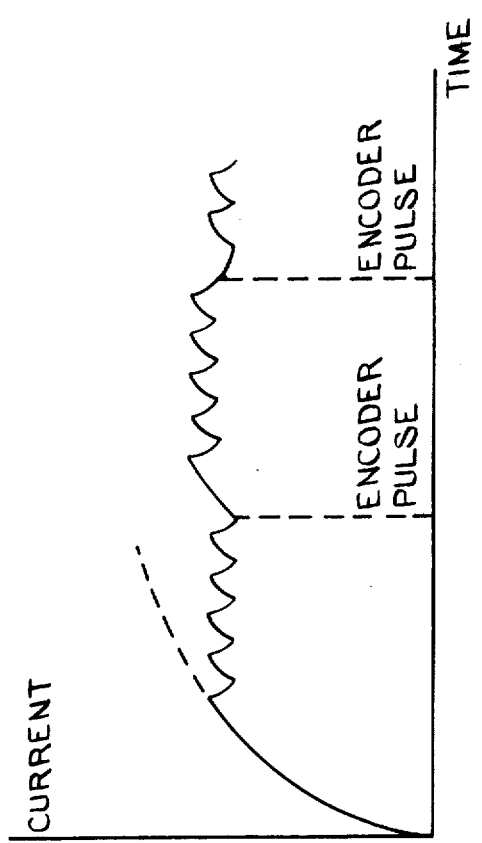
FIG. 3 is a graph of motor drive current against time.

It will be seen that the motor drive current is limited by this chopping circuit to a value governed by the voltage on the line 19, which in turn depends on the value of the counter 6. If, when an encoder pulse occurs, the motor is found by the comparator circuit 3 to be too slow, the value of the counter 6 will be reduced, increasing the total resistance of the network 7 and changing the level at which the drive current is chopped, as shown in FIG. 3.

The velocity profile held in the read-only memory 12 is chosen to be such that the motor accelerates at a fixed and constant rate. The motor current will therefore, when it has reached a steady level, be substantially constant and its value will depend on the load — the number of parts of stationery for example. The values of the resistors 16 and 17 are chosen to cope with the expected variations in load.

After the apparatus has accelerated the motor from rest in the manner described it moves it at a constant speed and then brings it to rest again at a constant rate of retardation. The extra elements needed (not shown) will be described.

When the motor has reached its maximum speed for the line-feed desired, logic freezes the read-only memory 12 at the value reached, which leads to the velocity being at that value. The profile of velocity against distance will now be flat. The motor current will again be substantially constant, but at a lower value than during the acceleration, since now it needs only to overcome friction and not inertia as well. The resistances 16 and 17 are therefore switched out and replaced by a second set appropriate to the new, lower current level.

During the third, deceleration, phase the original resistors 16 and another presettable resistor 17 are switched in, and the read-only memory 12 is counted down in the reverse direction from the point it reached at the end of the accleration phase. The motor is then retarded at a rate equal to the original rate of acceleration until it comes to rest at the desired point. However, switching transistors reverse the direction of the drive current so that the motor is now braked. And, in this phase, if the motor is too fast, the current must be increased to increase the braking. The leads 4 and 5 are therefore interchanged, so that the lead 4 counts the counter downwards and the lead 5 counts it upwards.

In the final interval, the motor velocity becomes zero or almost zero and the time counter 10 overflows. This is used as a signal for separate logic (not shown) to switch off the motor drive current.

The amount of adjustment to the drive current at any one pulse does not depend on the magnitude of the velocity error, but only on the value of the count. If the error is large the correction must take place in several stages, and will be at a rate depending on the size of the adjustment steps, not the magnitude of the error. This has the effect of introducing a lag function, which reduces the danger of the motor being subjected to shocks that might excite resonance or instability. In an analogue servo system special measures must be taken to control the gain and avoid instability, including for example introducing lag by filters.

The quasi-digital nature of this circuit (all the elements are basically on/off) also allows consistent servicing of the whole equipment without the need to take account of signal levels, as is the case with analogue circuits.

The following are examples of values that have proved satisfactory in a particular instance of apparatus such as that described.

The motor is a shell-armature permanent-magnet d.c. motor and drives a line printer carrying one to six-part stationery. For feeds of one line (1/6 inch, taking 8 milliseconds) to eight lines (⅓ inch, taking 23 milliseconds) the three phases of acceleration, constant velocity and retardation divide the time taken into three equal parts. For feeds of greater length the constant velocity reached during an eight-line feed is maintained as the slew speed for as long as necessary.

The counter 6 has a four-lead output and the resistance values in Ohms are:

|  | Acceleration | Constant Velocity | Retardation |
|---|---|---|---|
| Resistances 16 | 240K to 30K | 7.2K to 900 | 240K to 30K |
| Resistance 17 | 7.4K | 720 | 4.6K |
| Resistance 18 | 10K | 10K | 10K |

To illustrate the range of control provided by apparatus according to the invention, the resulting maximum and minimum motor drive currents (proportional to the voltages developed across the resistances 16 and 17) are: for acceleration, 30 to 38 amps; for constant velocity 2.5 to 6 amps; and for retardation 23 to 28 amps. Encoder pulses are produced at each 0.0052 inches of paper movement. The frequency of the oscillator 11 is 250KHz. The frequency of chopping of the drive current is 50–100KHz.

In the first encoder interval the desired time count in the counter 10 is 250; at the eighth encoder pulse, when the transition to constant velocity for a one-line feed occurs, it is 106; at the 64th encoder pulse, when slew speed is reached, the desired time count is 39.

When the motor starts a paper feed there are usually corrections for several encoder pulses. The motor then settles at the desired speed and continues with occasional corrections during the rest of the feed.

I claim:

1. Apparatus for controlling the position of a motor according to a predetermined velocity profile including changes of velocity the position control being at a rate independent of the magnitude of its departure from the profile; including a. means for producing output pulses characteristic of predetermined units of change of motor position,
b. storage means for storing said predetermined velocity profile,
c. first counter means for counting the output pulses to determine the position of the motor and for causing the storage means to produce at its output, for each said output pulse, an output signal which is characteristic of the nominal velocity value of the motor as defined by the profile;
d. means response to the output pulses for providing an indication of the actual velocity of the motor for each said output pulse;
e. comparator means for comparing for each said output pulse the storage means output defining a nominal velocity as defined by the profile for each output pulse, with the actual velocity as determined for the same output pulse to produce a first indication if the actual velocity is above the nominal value as defined by the profile, and a second indication if the actual velocity is below the nominal value as defined by the profile,
f. means for stepwise varying the energising current input for the motor, and
g. means for controlling the stepwise variation for each said decoder output pulse, which means is responsive to each of the first indications to change the current input by one of said steps as to cause the velocity value to be reduced, and is responsive to each of the second indications to cause the velocity to be increased.

2. Apparatus as claimed in claim 1, in which the means for controlling includes:
further storage means having a multiplicity of stages whose output states combine to form an ordered set; the further storage means being so responsive to each of the first indications to change its output state to the adjacent one of the ordered set in one sense and to each of the second indications to change its output to the adjacent one of the ordered set in the sense opposite to said one sense.

3. Apparatus as claimed in claim 2 in which the further storage means is a bi-directional counter.

4. Apparatus as claimed in claim 2 and further including means for producing a voltage depending upon the output states of the further storage means and in which the means for varying the energising current input includes means for rapidly and intermittently interrupting the supply of current when the current reaches a magnitude determined by reference to said voltage.

* * * * *